United States Patent Office 3,362,310
Patented Jan. 9, 1968

3,362,310
SWITCHING MECHANISM OF SHUTTER
Kiyoshi Kitai, Tokyo, Japan, assignor to Kabushiki
Kaisha Hattori Tokeiten
Filed Feb. 17, 1965, Ser. No. 433,389
Claims priority, application Japan, Feb. 21, 1964,
39/9,527
2 Claims. (Cl. 95—11.5)

ABSTRACT OF THE DISCLOSURE

A camera shutter switching mechanism is provided which includes a contact piece or member moving with the contact piece to close a flash circuit switch by movement of a controlling member. The controlling member is employed to displace the opening blades toward their opening direction, and thereafter, the controlling member and the contact piece are displaced to a switch opening position by movement of a member used in displacing the closing blades toward the closing direction of the shutter.

---

The present invention relates to cameras and in particular to switching mechanism in shutters having opening blades and closing blades.

The present invention deals particularly with structure for closing the circuit of a flash apparatus. In other words the camera of the present invention is adapted to make an exposure with flash illumination.

As is well known, when making an exposure with flash illumination it is required that the flash be ignited when the shutter is in an open position, so that the illumination resulting from the ignition of the flash bulb or the like can be used to make an exposure. One of the particular problems encountered with structures of this type is the proper timing of the ignition of the flash structure. The ignition is brought about electrically, upon closing of a switch, and one of the serious difficulties encountered with structures of this type is precise timing of the closing of a switch in such a way that the flash structure will produce a flash illumination which is timed properly with respect to the opening of the shutter. Another problem encountered with structures of the type described above in conventional flash control mechanisms, is the undue force which is required in order to completely close the actuating switch. Generally, such conventional switches comprise a movable contact and a stationary contact, with an undue degree of contact pressure required to make reliable electrical contact between the aforementioned pair of switch contacts. Accordingly, in a shutter arrangement wherein the shutter is required to be operative as a function of aperture size and exposure time, it is extremely disadvantageous to have the member which operates the blades to immediately thereafter operate the switch means for closing the switch.

It is accordingly a primary object of the present invention to provide a structure which makes it possible to conveniently and precisely adjust the timing of the closing of a switch which, when closed energizes a flash circuit so as to produce flash illumination.

It is another object of the present invention to provide a shutter switching mechanism wherein the operating member for opening the shutter blades is operative independently of the force required for closing the switch for controlling the flash illumination exposure.

According to the present invention, a contact piece or member moving with it closes a flash-circuit switch by movement of a controlling member used in displacing the opening blades in their opening direction, and thereafter the contact piece or the member moving with it is displaced to a switch-opening position by movement of a member used in displacing the closing blades in their closing direction.

Figure 1:
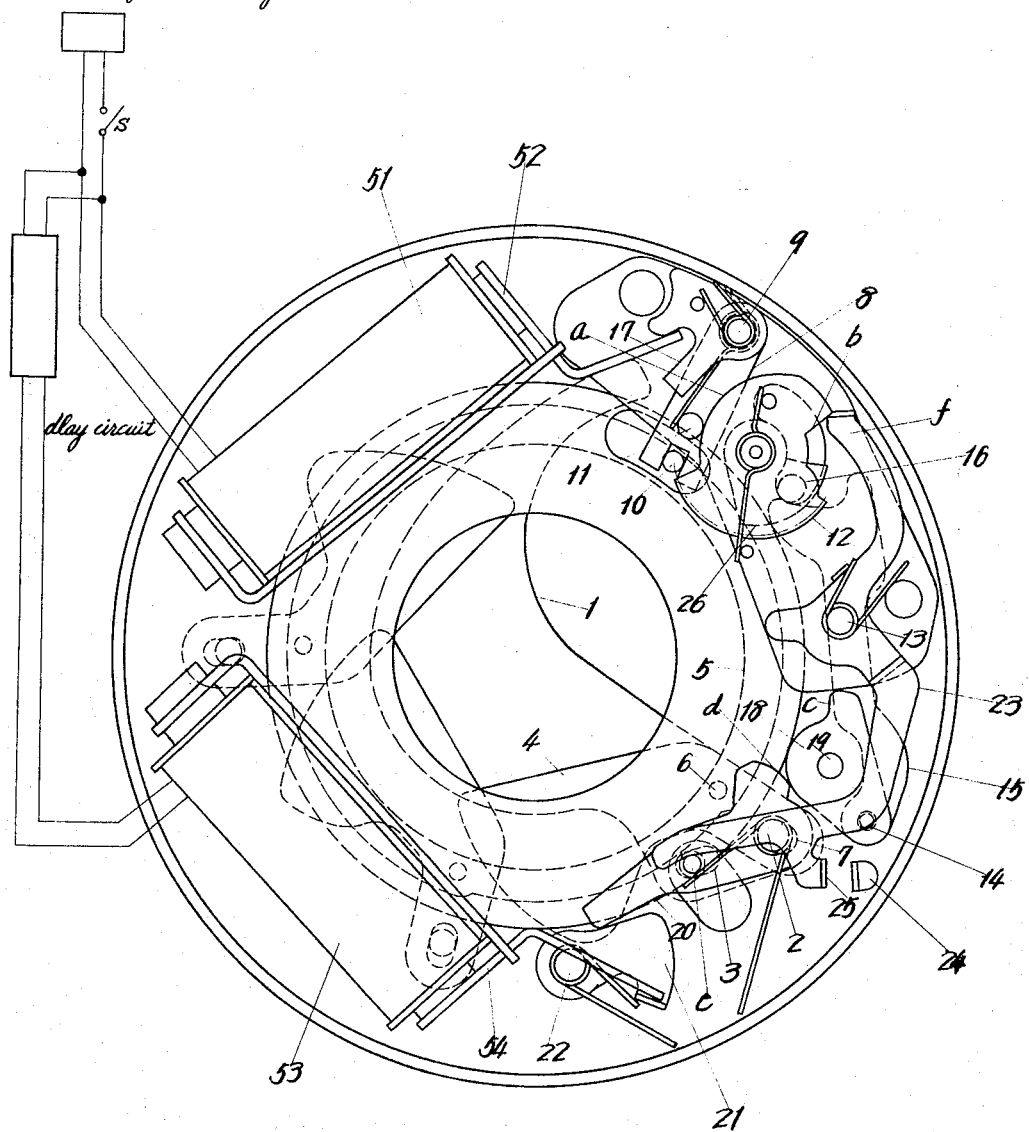
FIG. 1 shows structure of the invention in the interior of the shutter in the position which the parts take just after an exposure has been completed, FIG. 1 also showing schematically the electrical circuitry.
Figure 2:
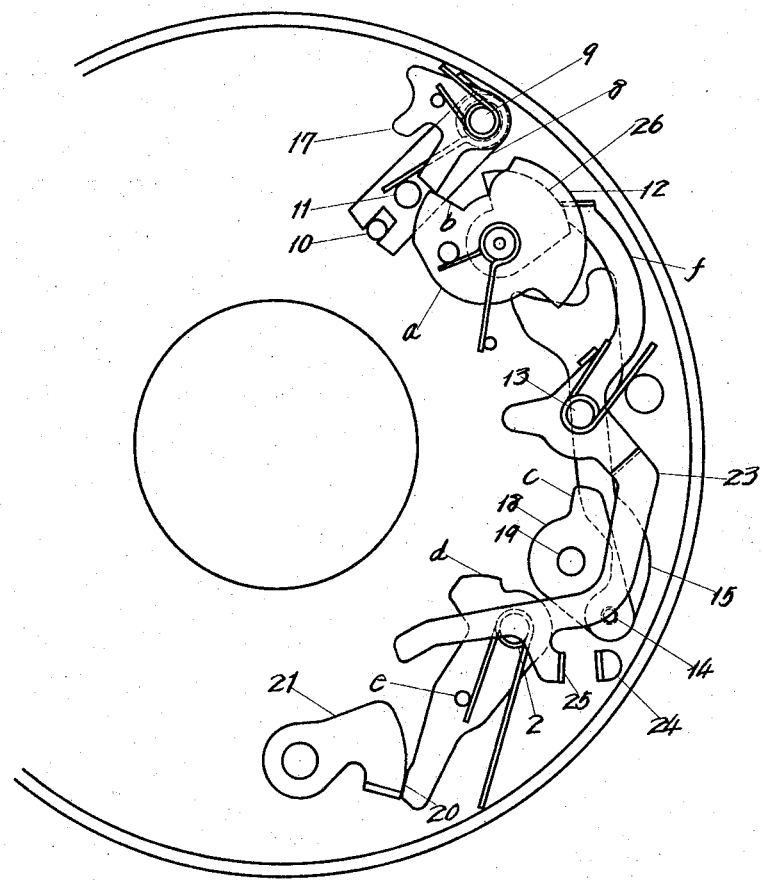
FIG. 2 shows the shutter control components of FIG. 1 in the position they take when the shutter is cocked.
Figure 3:
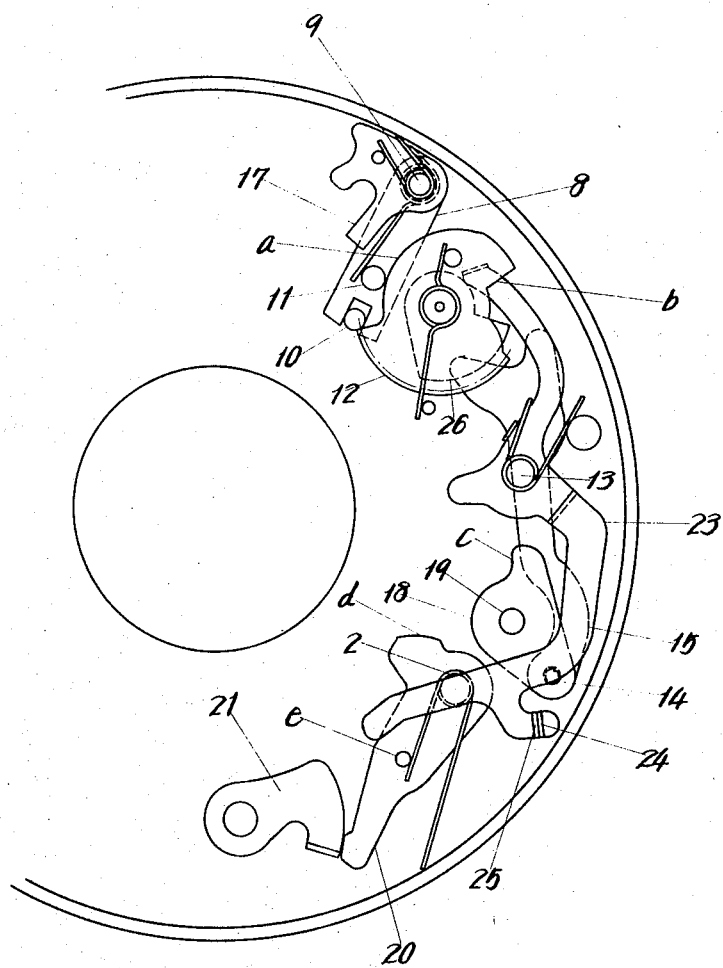
Figure 4:
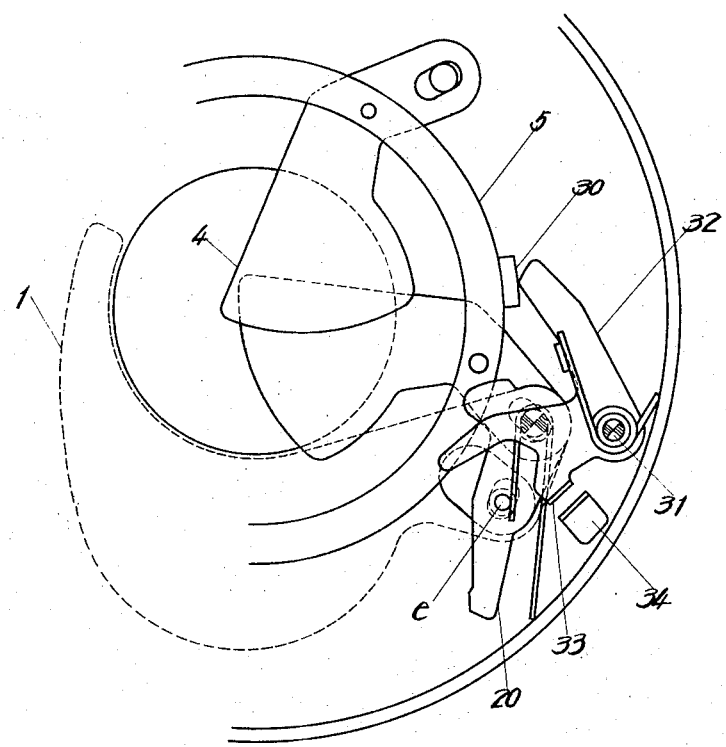

FIG. 3 shows the position which the shutter control components of FIGS. 1 and 2 take after the opening blades have been displaced to an open position but before the closing blades have been displaced to their closing position, so that FIG. 3 shows the position which the shutter control components take when the shutter is in an open position; and FIG. 4 illustrates another embodiment of a shutter of the invention, the parts being shown in the cocked position in FIG. 4.

Referring now to FIG. 1 of the drawings, a pair of closing blades 1 rotate around a common stationary pivot 2 and respectively have overlapping slots 3 which receive a common operating pin e. Opening blades 4 are pivoted respectively on pins 6 fixedly carried by a rotary ring 5 and the pins 2 are also respectively received in slots 7 which are respectively formed in the blades 4. The pin 2 which is shown at the lower right of FIG. 1 is thus received not only in the slot 7 of the blade 4 shown at the lower right of FIG. 1 but also serves to pivotally support both of the closing blades 1. In case of this embodiment of the invention, two closing blades 1 and five opening blades are provided, though only one and three of each are illustrated, respectively, for the sake of clarity.

Ring operating lever 8 is spring-biased to turn in a counterclockwise direction, as viewed in FIG. 1, on a fixed pin 9. The above-mentioned force which acts on lever 8 presses pin 11 on controlling lever member 8 against cam face $a$ of a segment gear 12 of a retarding mechanism. A notch of controlling lever member 8 receives a pin 10 on the above-mentioned ring 5. As shown in FIG. 1, segment gear 12 is spring-biased in the clockwise direction to engage pin 16. Cocking lever 15, which is pivotally mounted on pin 14, engages setting lever 18 which is rotatably mounted on rotary shaft 19. Accordingly, when the shutter is cocked, the extremity of cocking lever 15 is operative to rotate segment gear 12 in the counterclockwise direction by means of pin 16. A releasable holding member 17 is spring-biased to turn around the stationary pin 9 in a counterclockwise direction, as viewed in FIG. 1, and is adapted to engage with edge portion $b$ of the segment gear 12. Closing lever 20 is spring-biased to turn around the pin 2 shown at the lower right of FIG. 1 in a clockwise direction, as viewed in FIG. 1. It has a projection $d$ adapted to engage with projection $c$ of the setting lever 18 and it carries the pin $e$ which extends into the overlapping slots 3 of closing blades 1. A releasable holding member 21 for the closing lever 20 is spring-biased to turn in a counterclockwise direction, as viewed in FIG. 1, around a stationary pin 22, and an end of lever 21 is adapted to engage an end of closing lever 20. Switching lever 23 is spring-biased to turn in a counterclockwise direction, as viewed in FIG. 1, around stationary pin 13. This spring force acting on switch-actuating lever 23 presses an extremity thereof against pin $e$ in the middle of the closing lever 20 and thus switching lever 23 is restrained. The switching lever 23 carries movable contact piece 25 which forms a movable electric contact adapted to engage with fixed contact piece 24. The contacts 24 and 25 form a switch of an unillustrated flash circuit which is closed when the movable contact engages the stationary contact 24, so as to ignite the flash circuit and provide flash illumination when the movable contact 25 engages the stationary contact 24.

An end f of the lever 23 is controlled by a switching cam 26 fixed to gear 12 and moving therewith. Electromagnet 51 for releasing the opening blades has an armature 52 extending into a notch of holding member 17. Electromagnet 53 for releasing the closing blades has a movable armature 54 engaging with holding member 21.

FIG. 1 also shows schematically the electrical circuitry which includes, as shown at the upper left portion of FIG. 1, a source of electricity and a switch S which automatically closes when the operator actuates the shutter-release plunger, this switch automatically opening when the shutter release plunger is permitted by the operator to return to its initial position. The closing of the switch S will close a circuit to the electromagnet 51. This circuit is also connected through a suitable delay circuit which is schematically indicated at the upper left portion of FIG. 1, to the electromagnet 53, so that the latter electromagnet will be automatically energized within a given period of time subsequent to the energizing of the electromagnet 51.

The above-described structure of FIG. 1 operates in the following manner:

FIG. 1 shows the parts in a position where an exposure has just been completed. The switch S had been closed upon release of the shutter and has returned to its open position. The aperture of the shutter is closed by closing blades 1 and opening blades 4 are in their open position. In this position of the parts the shutter is ready to be cocked. At first, setting lever 18 is rotated in response to manual turning of the shaft 19, and at this time the lever 18 turns in a counterclockwise direction, as viewed in FIG. 1. Lever 18 thus displaces cocking lever 15 upwardly, so that its free end by pressing against the pin 16 turns the gear 12, together with the cam 26, in a counterclockwise direction, in opposition to the spring force acting on the gear 12. Thus, this transmission serves to rotate the first gear 12 in the counter clockwise direction, as viewed in FIG. 1. As a result the camming edge a of the gear 12 acts on the pin 11 to turn the controlling lever member 8 in a clockwise direction, about the pin 9, thus displacing the pin 10 and the ring 5 therewith in a counterclockwise direction, so that the opening blades 4 are turned to their closed position, and holding lever 17 arrests the segment gear 12 in the position shown in FIG. 2 after the camming edge b moves beyond the free end of holding lever 17 which snaps behind the camming edge b to assume the position shown in FIG. 2 where the holding lever 17 holds the gear 12 in the illustrated position to maintain the shutter cocked. During this turning of the lever 18 to cock the shutter, the camming portion c of lever 18 engages the camming portion d of lever 20 so as to turn the lever 20, and thus closing lever 20 rotates counterclockwise under the operation of setting lever 18. The turning of the pin e with the lever 20 at this time displaces the closing blades 1 to their open position, and the lever 20 is arrested in the position shown in FIG. 2 by holding member 21.

Though restraint of the counter clockwise rotative force acting on the switching lever 23 by pin e on closing lever 20 is removed, this restraint is still maintained since one end of the switching lever 23, namely the end f thereof, is engaged by switching cam 26 which turns together with gear 12. The cocking of the shutter has thus resulted in displacement of the opening blade means 4 to its closed position closing the shutter and in displacement of the closing blade means 1 to its open position, and of course at this time the gear 12 is held by the holding member 17 in readiness for running down of the shutter as soon as the holding member 17 is displaced to release the gear 12. FIG. 2 shows the parts in the cocked position of the shutter. In order to make an exposure the operator will actuate the plunger release, so that the switch S is closed, electromagnet 51 is energized and pulls armature 52, thus turning holding lever 17 clockwise, so as to release the gear 12 which now starts to run down, and thus the shutter is released. In the consequence, the gear 12 begins to rotate in a clockwise direction, as viewed in FIG. 2. Pin 11 follows the cam edge a of the gear 12 and operating controlling lever member 8 turns in the counterclockwise direction, as viewed in FIG. 2. At the same time, the fork of the operating lever turns ring 5 in the clockwise direction through a pin 10 to open blades 4. The closing blade means 1 remains in its open position at this time, so that the shutter is now open. Since, switching cam 26 moves together with the gear 12, switching lever 23 falls into the notch of the cam 26 and rotates in the counterclockwise direction by itself, displacing movable contact piece 25 into contact with fixed contact piece 24 to close a circuit. This latter circuit is the flash circuit, so that the flash bulb is ignited to provide the illumination for an exposure. FIG. 3 shows the position which the parts take when the flash circuit is closed and the opening blade means 4 has turned to its open position while the closing blade means 1 is still in its open position.

After an exposure time of a predetermined time interval has elapsed, the electromagnet 53 is energized through the delay circuit shown at the upper left of FIG. 1, and thus the locking member 21 turns in the clockwise direction under influence of electromagnet 53, to release the closing lever 20. Closing lever 20 separated from locking member 21 begins to move in the clockwise direction to close opened closing blades 1. By this movement, pin e on closing lever 20 turns switching lever 23 in the clockwise direction and separates contact piece 25 from piece 24 to open the circuit.

Thus, it will be seen that with the structure of the invention an opening means 10, 5, 6 is operatively connected, by controlling opening lever member 8 with the opening blade means 4 to displace the latter from its closed to its open position, and this latter opening means is operatively connected with a switch-closing means 26 which brings about the closing of the switch 24, 25 upon displacement of the opening blade means 4 from its closed to its open position. A closing means 20 is operatively connected with the closing blade means 1 to displace the latter from its open to its closed position to terminate the exposure, and this closing means 20 carries a switch-opening means e which displaces the switch 24, 25 to its open position, so as to open the flash circuit.

FIG. 4 shows another embodiment in the cocked position. With this embodiment instead of the lever 23 and the cam 26 which controls the latter, a lever 32 carries a movable switch contact 33, which corresponds to the contact 25 and which cooperates with a stationary contact 34 corresponding to the contact 24. Instead of the switch-closing cam 26, the ring 5 of the embodiment of FIG. 4 directly carries a lug 30 which engages the lever 32 so as to maintain the switch 34, 33 in its open position shown in FIG. 4 when the shutter is cocked. Releasing the shutter, ring 5 rotates clockwise, As opening blades 4 are opened by ring 5, lug 30 of ring 5 turns beyond the extremity of switching lever 32 which has rotative force around the fixed axle 31, and the switching lever 32 starts to rotate. By that rotation, movable contact piece 33 on the said lever 32 is pushed against fixed contact piece 34 and thus the flash circuit is closed. After the duration of exposure in said way, closing lever 20 rotates in the clockwise direction to close closing blades 1. Pin e on the closing lever 20 turns the other extremity of the switching lever to open the above circuit.

What I claim is:

1. In a camera, a shutter having cocked and release positions and including opening blade means having a closed position when the shutter is cocked and closing blade means having an open position when the shutter is cocked, opening means, spring-biased controlling member means operatively cooperating with said opening blade means for displacing the latter from said closed to an open position, to make an exposure, when the cocked shutter is released, closing means having a spring-biased closing member operatively connected to said closing blade means to displace the latter from said open to a closed position closing the shutter to terminate the exposure after a given time interval, flash-circuit switch means spring-biased between open and closed positions and displaceable therebetween, switch closing means actuated by said opening means for closing said switch means to close the flash circuit, and switch opening means actuated by said closing means to open said switch means and thus open the flash circuit when the closing blade means is moved from its open to its closed position to terminate the exposure.

2. The combination of claim 1 and wherein said switch means includes a stationary contact and a movable contact as well as a lever carrying said movable contact, said switch closing means including a rotary cam driven by said opening means and cooperating with said lever to displace the latter for bringing said movable contact into engagement with said stationary contact when said controlling member means is in a preselected position, said closing means including a motion-transmitting member which engages said lever to turn the latter and displace said movable contact away from said stationary contact.

References Cited

UNITED STATES PATENTS

| | | | |
|---|---|---|---|
| 2,621,570 | 12/1952 | Kesel et al. | 95—60 |
| 3,200,721 | 8/1965 | Kiper et al. | 95—11.5 |
| 3,259,042 | 7/1966 | Kagan | 95—11.5 |

NORTON ANSHER, *Primary Examiner.*

FRED L. BRAUN, *Assistant Examiner.*